(12) United States Patent
Papillon et al.

(10) Patent No.: US 10,673,872 B2
(45) Date of Patent: Jun. 2, 2020

(54) ADVANCED PERSISTENT THREAT DETECTION

(71) Applicant: Alcatel Lucent, Nozay (FR)

(72) Inventors: Serge Papillon, Nozay (FR); Haithem El Abed, Nozay (FR); Antony Martin, Nozay (FR)

(73) Assignee: ALCATEL LUCENT, Nozay (FR)

( * ) Notice: Subject to any disclaimer, the term of this patent is extended or adjusted under 35 U.S.C. 154(b) by 127 days.

(21) Appl. No.: 15/770,253

(22) PCT Filed: Nov. 7, 2016

(86) PCT No.: PCT/EP2016/076809
§ 371 (c)(1),
(2) Date: Apr. 23, 2018

(87) PCT Pub. No.: WO2017/089102
PCT Pub. Date: Jun. 1, 2017

(65) Prior Publication Data
US 2018/0255078 A1    Sep. 6, 2018

(30) Foreign Application Priority Data

Nov. 23, 2015 (EP) ..................................... 15306850

(51) Int. Cl.
*H04L 29/06* (2006.01)
*G06F 21/56* (2013.01)
(52) U.S. Cl.
CPC ...... *H04L 63/1416* (2013.01); *H04L 63/1441* (2013.01); *H04L 63/1466* (2013.01); *H04L 63/1491* (2013.01); *G06F 21/566* (2013.01)

(58) Field of Classification Search
CPC ............. H04L 63/1416; H04L 63/1441; H04L 63/1466; H04L 63/1491; G06F 21/566
See application file for complete search history.

(56) References Cited

U.S. PATENT DOCUMENTS

| 7,712,136 B2* | 5/2010 | Sprosts ................ G06Q 10/107 726/24 |
| 2005/0021740 A1* | 1/2005 | Bar ...................... H04L 63/0236 709/224 |

(Continued)

OTHER PUBLICATIONS

Min et al., Attack-tolerant distributed sensing for dynamic spectrum access networks, Oct. 2009, 17th IEEE International Conference on Network Protocols, pp. 294-303 (Year: 2009).*

(Continued)

*Primary Examiner* — Kenneth W Chang
(74) *Attorney, Agent, or Firm* — McCracken & Gillen LLC

(57) ABSTRACT

A threat level is evaluated for an ongoing attack detected for a set of resources based on received notifications having low weight in the evaluation of the threat level. If the threat level is smaller than an entrapment threshold, sensors associated with resources of an information system infrastructure that are potential subsequent targets of the ongoing attack are activated, the weight of the notifications sent from the activated sensors are set as average weight in the evaluation of the threat level, and the threat level is further evaluated for the ongoing attack. If the threat level is greater than the entrapment threshold, traps are deployed in the information system infrastructure, the weight of the notifications sent from the deployed traps are set as high weight in the evaluation of the threat level, and the threat level is further evaluated for the ongoing attack.

11 Claims, 2 Drawing Sheets

(56) References Cited

U.S. PATENT DOCUMENTS

Figure 1:
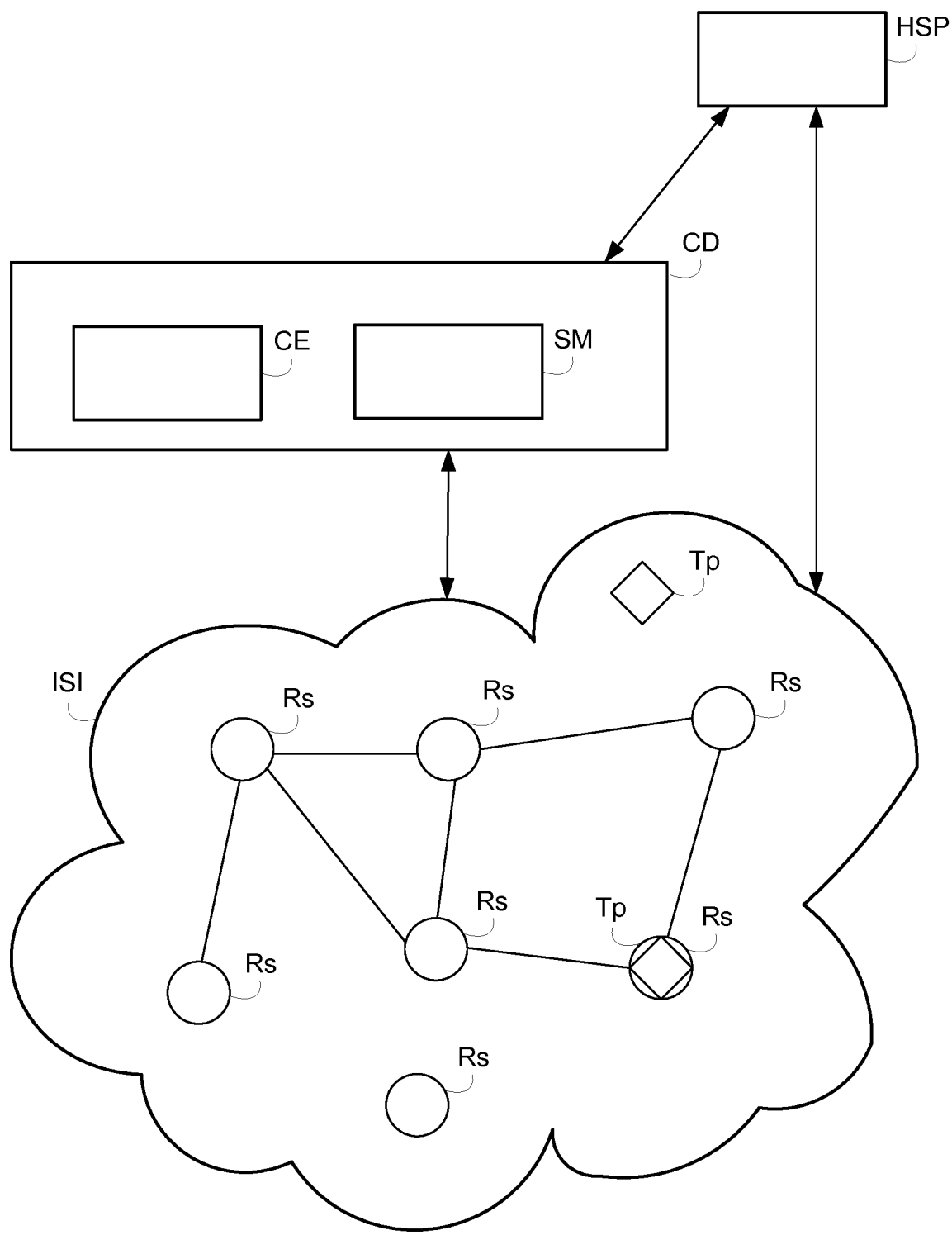

| | | |
|---|---|---|
| 2005/0182969 A1 | 8/2005 | Ginter et al. |
| 2009/0288165 A1* | 11/2009 | Qiu ....................... G06F 21/552 |
| | | 726/23 |
| 2011/0185418 A1* | 7/2011 | Boteler ............... H04L 63/1416 |
| | | 726/22 |
| 2011/0254680 A1* | 10/2011 | Perkinson .............. G08B 25/14 |
| | | 340/506 |
| 2015/0096024 A1 | 4/2015 | Haq et al. |
| 2015/0096048 A1* | 4/2015 | Zhang ................. G06F 21/6218 |
| | | 726/27 |
| 2015/0295943 A1 | 10/2015 | Malachi |

OTHER PUBLICATIONS

Muraleedharan et al, Secure self-adaptive mission-critical communication for distributed smart home sensor network, Jul. 2009, 6th Annual International Mobile and Ubiquitous Systems: Networking & Services, MobiQuitous, pp. 1-4 (Year: 2009).*

* cited by examiner

ADVANCED PERSISTENT THREAT DETECTION

FIELD OF THE INVENTION

The present invention pertains to the field of data security. More specifically, one embodiment of the disclosure relates to a system of discovering and identifying advanced persistent threats (APTs).

BACKGROUND

Advanced persistent threats (APTs) are a type of malware that target a particular individual and seek to extract a particular set of information that is known to be accessible to the defined target. The targets may include individuals and organizations with high value information.

It is commonly assumed that the victim network is compromised and the focus of the detection is on the lateral movement.

To this problem, there exist two kinds of solutions:
monitor and scrutinize everything in the protected system but this comes at a very high and prohibitive cost especially in terms of performance (degradation) and of operational maintenance.
deploy many traps (as fake resources) that by nature are limited and do not get all the attacks. This solution to be efficient requires a thorough deployment with a lot of attention and management.

Thus, there is a need for improved techniques that enable the detection and prediction of advanced persistent threats.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a method is provided for detecting persistent attack in an information system infrastructure comprising resources that are associated with sensors able to send notifications to a management device, the notifications comprising a report on the access of the associated resources, the method comprising the following steps in the management device:

evaluating a threat level for an ongoing attack detected for a given set of resources in function of received notifications having low weight in the evaluation of the threat level, if the threat level is smaller than an entrapment threshold, activating sensors associated with resources of the information system infrastructure that are potential subsequent targets of the ongoing attack, setting the weight of the notifications sent from the activated sensors as average weight in the evaluation of the threat level, and evaluating the threat level for the ongoing attack further in function of received notifications sent from the activated sensors, if the threat level is greater than the entrapment threshold, deploying traps in the information system infrastructure, the traps being potential subsequent targets of the ongoing attack and able to send notifications to the management device, and setting the weight of the notifications sent from the deployed traps as high weight in the evaluation of the threat level, and evaluating the threat level for the ongoing attack further in function of received notifications sent from the deployed traps.

Advantageously, the invention offers a management of a set of genuine resources notifications with the management of a set of booby-traps that provides an efficient detection of a persistent attack and reacts to it with entrapment if necessary.

The rules of activation/deactivation of the sensors and the deployment of the booby-traps are adaptive and based on decision criteria such as the nature of the triggered events, zones, etc. and gradual to get the best of detection while keeping the best performance.

In an embodiment, the traps include traps as fake resources and booby traps as legitimate resources.

In an embodiment, if the threat level is greater than a mitigation threshold that is greater than the entrapment threshold, the management device sends an alert to a security management platform, the alert indicating that the ongoing attack is a persistent attack.

In an embodiment, the management device deploys traps as fake resources being potential subsequent targets of the ongoing attack to mitigate the progress of said ongoing attack.

In an embodiment, the given set of resources and resources that are potential subsequent targets of the ongoing attack are interrelated resources.

In an embodiment, interrelated resources are defined using distance measures based on rules capturing interrelatedness between resources.

In an embodiment, the persistent attack is an advanced persistent threat.

In an embodiment, the deployed traps are activated or created.

In an embodiment, a notification comprises a report on the access of the associate resource or the trap.

The invention relates also to a device for detecting persistent attack in an information system infrastructure comprising resources that are associated with sensors able to send notifications to the management device, the notifications comprising a report on the access of the associated resources, the device comprising:

means for evaluating a threat level for an ongoing attack detected for a given set of resources in function of received notifications having low weight in the evaluation of the threat level, means for, if the threat level is smaller than an entrapment threshold, activating sensors associated with resources of the information system infrastructure that are potential subsequent targets of the ongoing attack, for setting the weight of the notifications sent from the activated sensors as average weight in the evaluation of the threat level, and for evaluating the threat level for the ongoing attack further in function of received notifications sent from the activated sensors, means for, if the threat level is greater than the entrapment threshold, deploying traps in the information system infrastructure, the traps being potential subsequent targets of the ongoing attack and able to send notifications to the management device, for setting the weight of the notifications sent from the deployed traps as high weight in the evaluation of the threat level, and for evaluating the threat level for the ongoing attack further in function of received notifications sent from the deployed traps.

The invention also pertains to a computer program capable of being implemented within a device, said program comprising instructions which, when the program is executed within said device, carry out steps according to the inventive method.

Figure 2:
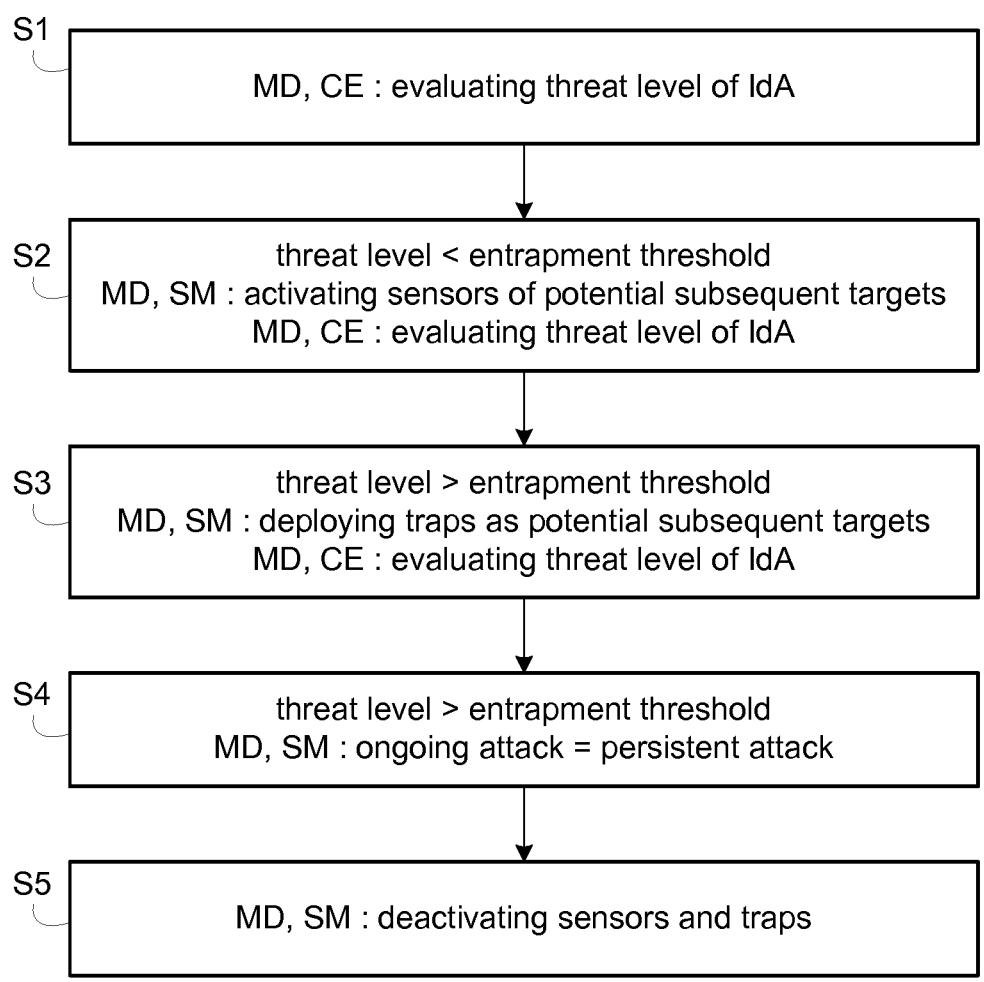

The present invention and the benefits thereof shall be better understood upon examining the description below, which makes reference to the attached figures, in which:

FIG. 1 is a schematic block diagram of a communication system according to one embodiment of the invention for advanced persistent threat detection; and FIG. 2 is an algorithm of a method for advanced persistent threat detection according to one embodiment of the invention.

As used herein, the term "attack" refers to an event in an information system that transgress the normal authorized usage of the system or exploits deliberately or accidentally a vulnerability in the system as for example a network scanning, a password cracking, a sending of malicious email (also called spam), a sending of a malformed internet protocol (IP) packet.

An advanced persistent threat (APT) is an information system attack in which an unauthorized person or an attacker gains access to a resource of the information system and stays there undetected for a long period of time (avoiding any action that may lead to its detection like causing damage to the information system). A motivation of an APT for example is to steal data or to use the information system as a gateway to access another information system that is of interest.

With reference to FIG. 1, a management device MD is able to monitor an information system infrastructure ISI, more especially is able to monitor resources Rs of the information system infrastructure, and is under supervision of a hypervisor security platform HSP.

The information system infrastructure ISI can be the target of an APT or other persistent security threat from an attacker, for example via a front end server of the information system infrastructure ISI. The information system infrastructure ISI can comprise a plurality of servers as well as a plurality of storage devices. The servers may be of any type delivering different services. For example, a server running web applications is a file transfer protocol (FTP) server.

The architecture of the information system infrastructure ISI can be designed as comprising different kind of resources. Different kind of traps can be deployed in the information system infrastructure.

A resource of the information system can be of different nature, physical or virtual, such as a file, a directory, a network drive, a service like a login, an account, a network resource like a VPN (virtual private network) . . . .

Traps can be also of different nature include traps as fake resources and booby traps as legitimate resources.

A booby trap is a device or setup that is intended to be triggered unknowingly by the actions of the attacker. The purpose of a booby trap is to form bait designed to lure the attacker towards it. In a first example, a booby trap is a script in a document (like PDF) that can be executed at specific moments such as opening or closing of the document. In a second example, a script can be executed when clicking on an URL before forwarding the user towards the corresponding web page.

A trap as a fake resource can be a fake network share or a fake file.

Resources Rs of the information system infrastructure are associated with sensors able to send notifications to the management device.

A sensor may be capable of detecting an attack and is able to generate and send notifications. A sensor may be made of specific electronic devices (micro-controllers, application specific integrated systems (ASICs) . . . ) or in an information technology environment, it may simply be a software run by a computer, a server or a router.

A notification comprises a report on the access of the resource. The sensor monitors any type of access of the resource, by monitoring entering data streams intended for the resource, for example in order to read, copy or modify contents associated with the resource. The sensors can be in an active mode or in an inactive mode.

The resources can be arranged as groups of interrelated resources, using distance measures based on rules capturing interrelatedness between resources. The groups of resources can be defined in zones plane.

Traps Tp of the information system infrastructure are also associated with sensors able to send notifications to the management device.

A trap can be mistaken for a resource or linked to a resource.

The management device MD comprises a correlation engine CE and a sensor manager SM.

The correlation engine CE is in charge of the reception of every notification emitted by the information system. The correlation engine CE keeps track of every notification and correlates them in one or several ongoing attacks ("attack context"). The tracks and the corresponding notifications are stored in a database dedicated to ongoing attack tracks. The correlation engine computes a threat level for each ongoing attack and triggers the sensor manager SM whenever a threat level changes for a given ongoing attack.

The sensor manager SM decides, based on a threat level of an ongoing attack, to enable the notification capability of some resources, to activate traps or create new traps and enforce them in the information system infrastructure, or to send an alert to a security management platform of the information system infrastructure.

The hypervisor security platform HSP is able to take decisions to mitigate an APT, in view of information provided by the management device MD.

With reference to FIG. 2, a method for an advanced persistent threat detection according to one embodiment of the invention comprises steps S1 to S5 executed by the management device MD monitoring the information system infrastructure.

Giving the nature of APT that may span several days even months, the time between each step of the method may last also several days or months.

In step S1, the correlation engine CE evaluates a threat level for each ongoing attack detected at a given set of resources, the threat level being associated with an identifier IdA of the ongoing attack. When a threat level changes for a given ongoing attack, the correlation engine triggers the sensor manager SM.

In step S2, if the threat level is smaller than an entrapment threshold, the sensor manager SM is in a detection phase. During this phase, the sensor manager SM activates the sensors of some resources thanks to the ongoing attack context and the zones plan. The resources associated with the activated sensors are potential subsequent targets of the ongoing attack.

Identifiers IdS of the newly activated sensors are sent back to the correlation engine CE and associated with the identifier IdA of the ongoing attack. The idea is to try to get the attacker to trigger the newly activated sensors in order to identify the skills and objectives of the attacker, hence the sensors are activated "on a very likely path" (computed by predetermined rules) for the ongoing attack. The sensor manager SM sets the weight of the notifications coming from the activated sensors as average weight in the evaluation of the threat level by the correlation engine CE.

The correlation engine CE evaluates then the threat level for the ongoing attack further in function of received notifications sent from the activated sensors.

In step S3, if the threat level is greater than the entrapment threshold but is smaller than a mitigation threshold, the sensor manager SM is in an entrapment phase. During this phase, the sensor manager SM deploys traps in the information system infrastructure, by activating traps or creating new traps, and enforces them in the information system infrastructure. The deployed traps are potential subsequent targets of the ongoing attack.

The deployed traps include traps as fake resources and booby traps as legitimate resources. Booby traps can be first deployed to lure the attacker toward a legitimate resource and then traps can be second deployed to confirm the nature of attack with fake resources.

The goal is the same as in the detection phase, but the notifications may come from traps. Identifiers IdT of the newly activated traps or created traps are sent back to the correlation engine CE and associated with the identifier IdA of the ongoing attack. The sensor manager SM sets the weight of the notifications coming from the deployed traps as high weight in the evaluation of the threat level by the correlation engine CE.

If such a trap is triggered, the odds that the notifications coming from the trap are false positives are quite void. So the correlation engine will calculate a very high threat level.

The correlation engine CE evaluates then the threat level for the ongoing attack further in function of received notifications sent from the deployed traps.

In step S4, if the threat level passes a mitigation threshold, the sensor manager SM is in a mitigation phase, which means that the ongoing attack is definitely not a false positive and is a persistent attack.

The first time the mitigation threshold is reached, the sensor manager SM sends an alert to the security management platform of the information system infrastructure with all the information gathered on the ongoing attack, the alert indicating at least that the ongoing attack is a persistent attack. While the security management platform evaluates the situation, the sensor manager SM will continue to activate sensors and deploy traps as fake resources, not only to better analyze the ongoing attack but to try to mitigate it by luring the attackers towards useless paths: while the attacker lose time attacking traps, the real resources of the information system are still safe. The more the attacker reach sensible zones and resources, the more traps could be activated in a try to camouflage the real resources.

In step S5, once the security management platform applies a response, the sensor manager SM may receive the order to deactivate every sensors and traps that have been activated for a given ongoing attack. The sensor manager SM will then abide to the order. The database dedicated to ongoing attack tracks is then clean of every data related to the ongoing attack.

The management device MD keeps track of the observed attack paths and can refine sensors activation rules accordingly.

Giving the nature of APT that may span several days even months, the management device MD will not automatically timeout the ongoing attacks but instead will notify a security officer who will be required to manually clean the databases, deactivate selected notification and traps or take other appropriate actions.

The management device MD allows thus detection of the APT and its lateral movements, i.e. the next phase of the APT attack, with the combined monitoring and trapping mechanisms in the most efficient way. The adaptive combination of those two mechanisms makes protection gradual for the best efficiency, ultimately going to the entrapment and mitigation.

In one example, an ongoing attack is detected for a given file in a given directory. As the threat level of the ongoing attack is under the entrapment threshold, sensors associated with neighboring files in the given directory are activated to report any type of access to these neighboring files. When the threat level of the ongoing attack passes the entrapment threshold, booby traps and traps are deployed to lure the attacker in order to confirm the APT nature of the ongoing attack. A trap can relate to the availability of a file with sensitive information that is similar in nature to neighboring files and is located in another directory.

In another example during mitigation phase, a booby trap can be a login service as a legitimate resource for a sensitive server. Once the booby trap was activated, i.e. the attacker felt in the booby trap, the attacker is "located" in the server. Traps as fake resource can then be deployed and can be fake directory shares.

The invention described here relates to a method and a device for an advanced persistent threats detection. According to one implementation of the invention, the steps of the invention are determined by the instructions of a computer program incorporated into the device, such as the management device MD. The program comprises program instructions which, when said program is loaded and executed within the device, carry out the steps of the inventive method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the inventive method.

The invention claimed is:

1. A method for detecting a persistent attack in an information system infrastructure comprising resources that are associated with sensors able to send notifications to a management device, the notifications comprising a report on access of the associated resources, the method comprising the following steps in the management device:
    evaluating a threat level for an ongoing attack detected for a given set of resources based on received notifications having low weight in the evaluation of the threat level,
    if the threat level is smaller than an entrapment threshold, activating sensors associated with the resources of the information system infrastructure that are potential subsequent targets of the ongoing attack, setting a weight of the notifications sent from the activated sensors as average weight in the evaluation of the threat level, and evaluating the threat level for the ongoing attack further based on received notifications sent from the activated sensors,
    if the threat level is greater than the entrapment threshold, deploying traps in the information system infrastructure, the traps being potential subsequent targets of the ongoing attack and able to send notifications to the management device, setting the weight of the notifications sent from the deployed traps as high weight in the evaluation of the threat level, and evaluating the threat level for the ongoing attack further based on received notifications sent from the deployed traps, and if the threat level is greater than a mitigation threshold that is greater than the entrapment threshold, sending an alert to a security management platform, the alert indicating that the ongoing attack is a persistent attack.

2. The method according to claim 1, wherein the traps include traps as fake resources and booby traps as legitimate resources.

3. The method according to claim 1, further comprising deploying traps as fake resources being potential subsequent targets of the ongoing attack to mitigate the progress of said ongoing attack.

4. The method according to claim 1, wherein the given set of resources and resources that are potential subsequent targets of the ongoing attack are interrelated resources.

5. The method according to claim 4, wherein interrelated resources are defined using distance measures based on rules capturing interrelatedness between resources.

6. The method according to claim 1, wherein the persistent attack is an advanced persistent threat.

7. The method according to claim 1, wherein the deployed traps are activated or created.

8. The method according to claim 1, wherein a notification comprises a report on the access of the associate resource or the trap.

9. A non-transitory information medium capable of being implemented within a management device configured to detect persistent attacks in an information system infrastructure comprising resources that are associated with sensors able to send notifications to a management device, the notifications comprising a report on the access of the associated resources, said information medium storing computer executable instructions for performing steps comprising:

evaluating a threat level for an ongoing attack detected for a given set of resources based on received notifications having low weight in the evaluation of the threat level, if the threat level is smaller than an entrapment threshold, activating sensors associated with the resources of the information system infrastructure that are potential subsequent targets of the ongoing attack, setting a weight of the notifications sent from the activated sensors as average weight in the evaluation of the threat level, and evaluating the threat level for the ongoing attack further based on received notifications sent from the activated sensors, if the threat level is greater than the entrapment threshold, deploying traps in the information system infrastructure, the traps being potential subsequent targets of the ongoing attack and able to send notifications to the management device, setting the weight of the notifications sent from the deployed traps as high weight in the evaluation of the threat level, and evaluating the threat level for the ongoing attack further based on received notifications sent from the deployed traps, and if the threat level is greater than a mitigation threshold that is greater than the entrapment threshold, sending an alert to a security management platform, the alert indicating that the ongoing attack is a persistent attack.

10. A system, comprising:

a plurality of electronic sensors;

a management device adapted to detect a persistent attack in an information system infrastructure that comprises resources that are associated with the electronic sensors able to send notifications to the management device, the notifications comprising a report on access of the resources; and a security management platform adapted to receive information on attacks of the information system infrastructure sent by the management device and to mitigate an advanced persistent threat in view of the received information;

wherein the management device is further adapted to:

evaluate a threat level for an ongoing attack detected for a given set of resources based on received notifications having low weight in the evaluation of the threat level, if the threat level is smaller than an entrapment threshold, activate the electronic sensors associated with the resources of the information system infrastructure that are potential subsequent targets of the ongoing attack, for setting a weight of the notifications sent from the activated electronic sensors as average weight in the evaluation of the threat level, and for evaluating the threat level for the ongoing attack further based on received notifications sent from the activated electronic sensors, if the threat level is greater than the entrapment threshold, deploy traps in the information system infrastructure, the traps being potential subsequent targets of the ongoing attack and able to send notifications to the management device, for setting the weight of the notifications sent from the deployed traps as high weight in the evaluation of the threat level, and for evaluating the threat level for the ongoing attack further based on received notifications sent from the deployed traps, and if the threat level is greater than a mitigation threshold that is greater than the entrapment threshold, send an alert to the security management platform, the alert indicating that the ongoing attack is a persistent attack.

11. The system according to claim 10, wherein the resources comprise one or more servers and one or more storage devices.

* * * * *